United States Patent
Tame

Patent Number: 5,203,608
Date of Patent: Apr. 20, 1993

[54] SEAT ASSEMBLY WITH ARTICULATING CUSHION AND SEAT BACK RECLINER

[75] Inventor: Omar D. Tame, West Bloomfield, Mich.

[73] Assignee: Hoover Universal, Inc., Plymouth, Mich.

[21] Appl. No.: 662,485

[22] Filed: Feb. 28, 1991

[51] Int. Cl.$^5$ .............................................. B60N 2/00
[52] U.S. Cl. ..................................... 297/320; 297/330
[58] Field of Search ............... 297/320, 361, 317, 321, 297/319, 330

[56] References Cited

U.S. PATENT DOCUMENTS

| | | | |
|---|---|---|---|
| 1,271,636 | 7/1918 | Walton | 297/320 |
| 2,599,079 | 6/1952 | Tatom | 297/320 |
| 2,641,305 | 6/1953 | Oishei | 297/330 |
| 2,714,922 | 8/1955 | McKibban et al. | 297/330 |
| 3,252,734 | 5/1966 | Berlin | 297/317 |
| 3,381,997 | 5/1968 | Fritz et al. | 297/330 |
| 4,777,847 | 10/1988 | Pickles . | |

FOREIGN PATENT DOCUMENTS 470122 8/1937 United Kingdom ............... 297/317

*Primary Examiner*—Kenneth J. Dorner
*Assistant Examiner*—Cassandra Hope
*Attorney, Agent, or Firm*—Harness, Dickey & Pierce

[57] ABSTRACT

A seat assembly is disclosed with an articulating seat cushion rotatable about a transverse axis near the front end of the seat cushion. The seat back is reclinable and is coupled to the rear of the seat cushion so as to raise the rear end of the seat cushion in response to rearward reclining of the seat back whereby the seat occupant's hip point is raised as the seat back is reclined to provide a more comfortable recliner. The recliner drive mechanism includes a lead screw with a motor/transmission assembly to drive the lead screw and includes a thrust washer carried by the lead screw to transfer axial loads on the lead screw directly to the motor mount rather than allowing the lead screw loads to be transferred to the internal components of the motor/transmission assembly.

4 Claims, 4 Drawing Sheets

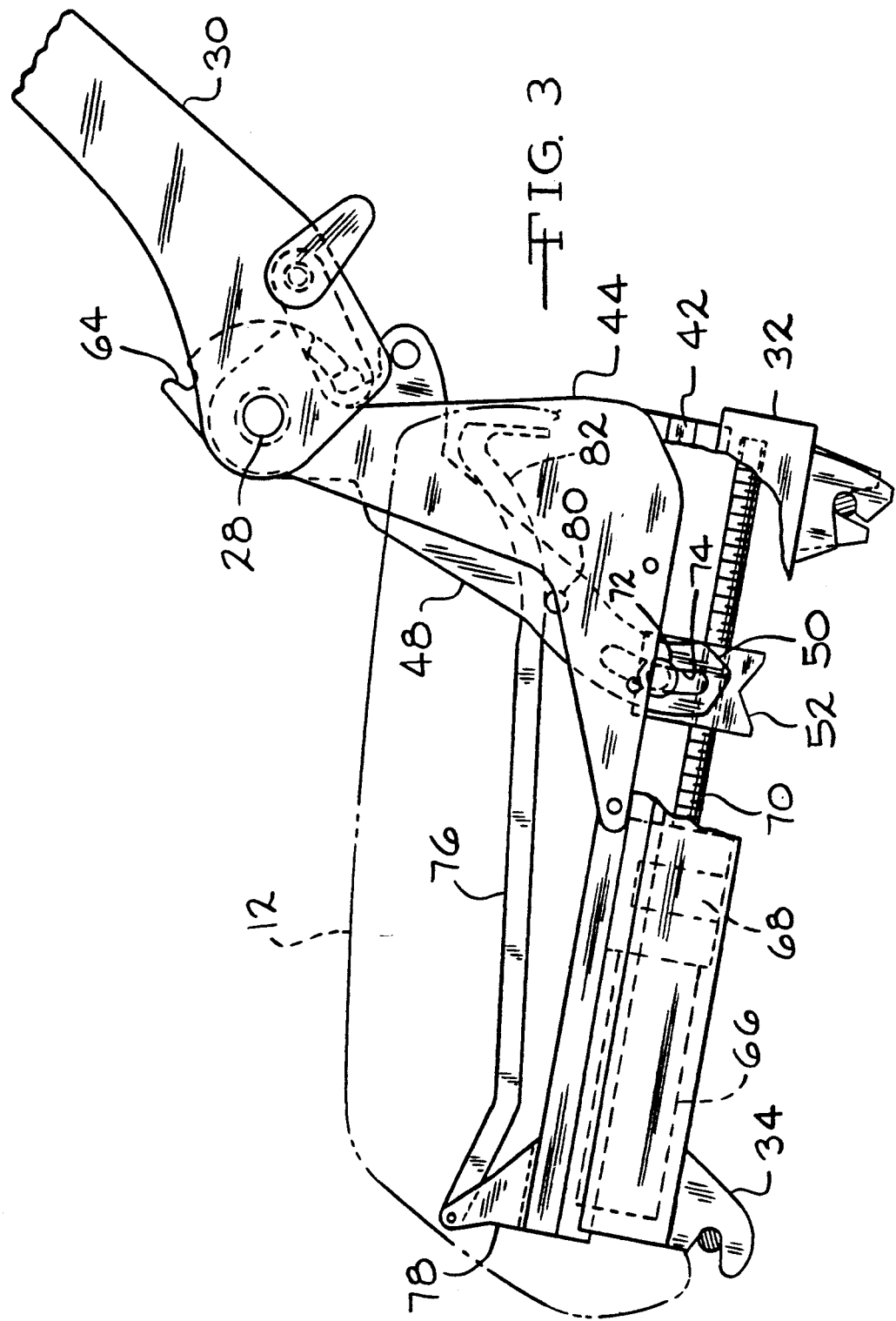

SEAT ASSEMBLY WITH ARTICULATING CUSHION AND SEAT BACK RECLINER

BACKGROUND AND SUMMARY OF THE INVENTION

The present invention relates to seat assemblies and in particular to a seat assembly having a articulating seat cushion integrally connected to the seat back recliner so as to raise the rearward end of the seat cushion as the seat back is reclined rearwardly.

Many vehicle seat assemblies are equipped with a reclinable seat back that pivots about an axis near the rear of the seat cushion. When the seat back is reclined, unless the position of the occupant's hips are also moved upwardly, there is often a relative motion between the occupant's upper torso and the seat back against which the occupant is leaning. In addition to being uncomfortable, the relative motion or back scruffing can also have a tendency to dishevel the occupant's clothing.

While back scruffing occurs in any seat, the degree of relative motion and discomfort is somewhat dependent upon the location of the seat back pivot axis relative to the seat cushion. If the pivot axis is in a high position relative to the seat cushion, the back scruffing can be particularly troublesome. One reason for having a relatively high pivot axis for the seat back occurs in seat assemblies in which the seat belt system is attached directly to the seat assembly. In such a seat assembly, a high pivot axis can reduce the bending moment applied to the seat back by the shoulder belt during a vehicle collision.

Accordingly it is an objective of the present invention to reduce the relative motion between an occupant's upper torso and the seat back as the seat back is being reclined to various positions.

It is a feature of the present invention to provide a mechanism by which the hip point of the occupant is raised simultaneously with the seat back being reclined rearward to reduce relative motion. This is accomplished by raising the rear portion of the seat cushion so as to raise the hip point of the seat occupant.

The seat assembly of the present invention, having a relatively high seat back pivot axis, includes a seat cushion pivotally mounted about an axis near the front end of the seat cushion and a cam mechanism interconnecting the rearward end of the seat cushion with the seat back to raise the rear of the seat cushion in response to rearward rotation of the seat back. By so doing, as the seat back is reclined the rear of the seat cushion is raised, raising the occupant's hip point. This reduces or eliminates the relative motion of the occupant's torso with the seat back increasing the comfort during the reclining operation as well as improving the overall comfort of the reclined seat.

Further objects, features and advantages of the invention will become apparent from a consideration of the following description and the appended claims when taken in connection with the accompanying drawings.

BRIEF DESCRIPTION OF THE DRAWINGS

FIG. 3 is a side view similar to FIG. 2 showing the seat back reclined and the seat cushion raised;

DETAILED DESCRIPTION OF THE INVENTION

Figure 1:
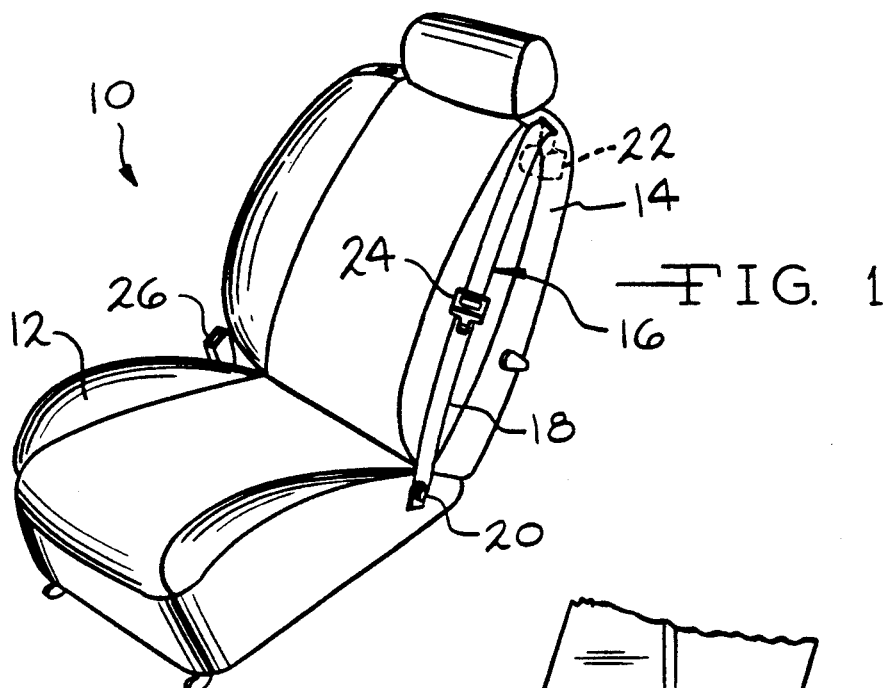
FIG. 1 is a perspective view of the seat assembly of the present invention.
Figure 4:
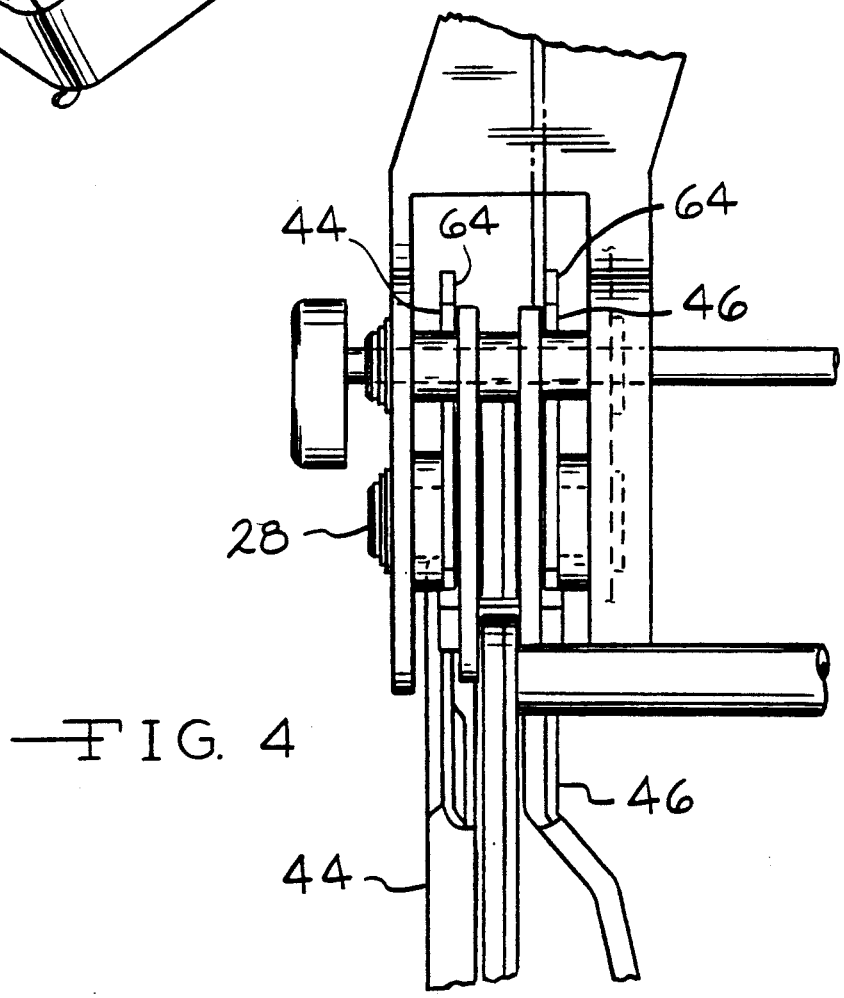
FIG. 4 is a rear view of the seat back pivot.

The seat assembly of the present invention is shown in FIG. 1 and designated generally at 10. Seat assembly 10 includes a seat cushion 12 and a seat back 14 extending upwardly at the rear of cushion 12. A seat belt system 16 is mounted directly to the seat assembly and includes a belt 18, one end of which is fixed to the seat cushion at 20. The other end of the belt is wrapped on a spool of retractor mechanism 22 mounted to the seat back 14. A clasp 24 is slidably carried on the belt 18 between mount 20 and the retractor 22. To buckle oneself into the seat assembly, the clasp 24 is pulled across the user's chest and inserted into buckle 26 mounted on the opposite side of the seat assembly from mount 20. In so doing, the belt 18 forms a lap belt and a shoulder belt to restrain the occupant in the seat assembly.

Figure 2:
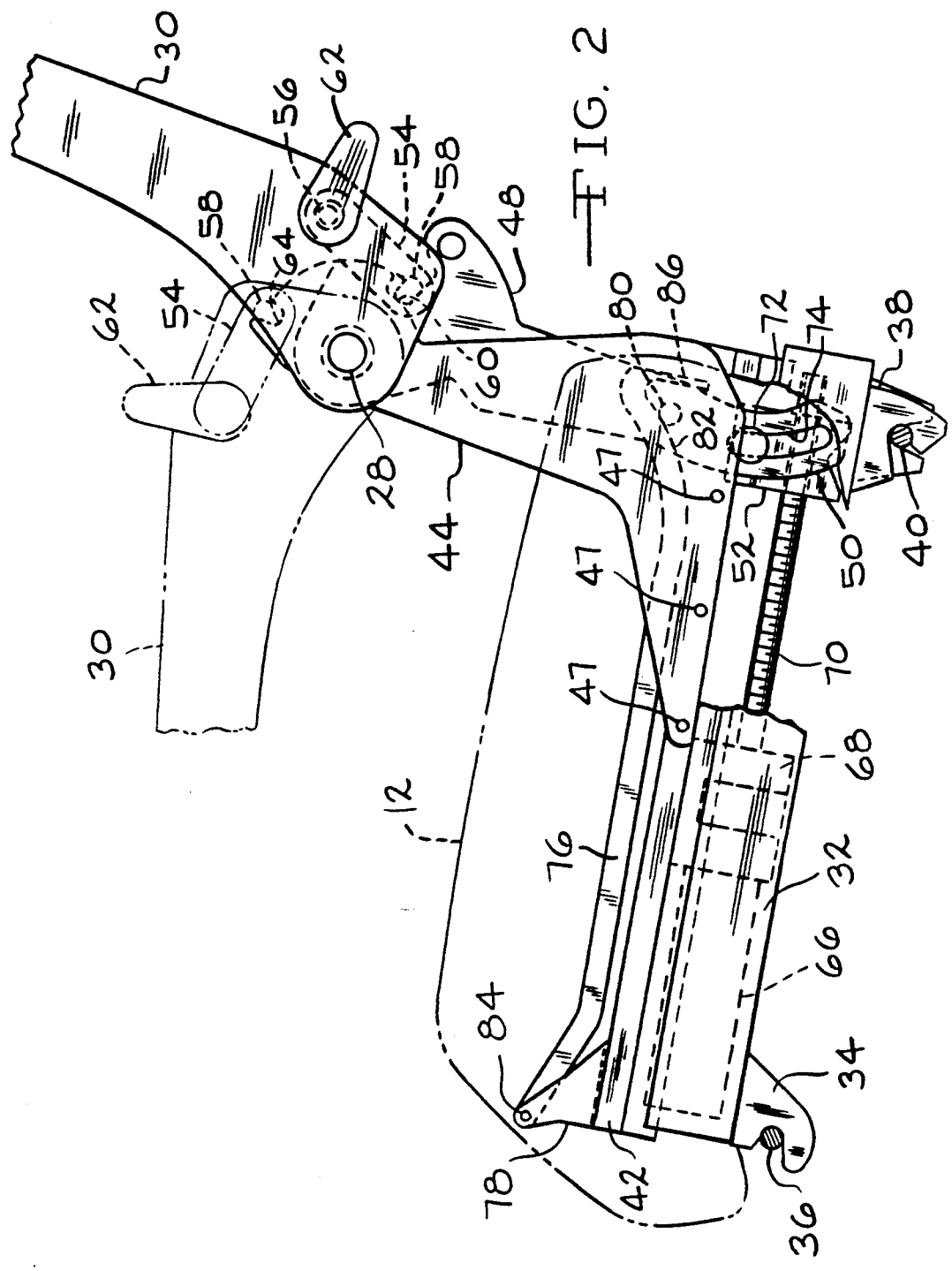
FIG. 2 is a side elevational view of the seat assembly showing the recliner mechanism and the cushion lift mechanism in the lowered position of the seat cushion corresponding to the upright position of the seat back.

One consequence of mounting the seat belt system 16 to the seat assembly is that the seat assembly must be designed to accommodate the increased loads applied to the seat assembly by the seat belt system during a vehicle collision. During front impact collision, the shoulder belt will apply a forward bending load to the seat back, tending to rotate the seat back forward about its pivot point. One way to reduce the moment applied to the seat back is to raise the seat back pivot point to shorten the moment arm. Such is the case with seat assembly 10 as seen in FIG. 2 with a seat back pivot 28 located substantially above the seat cushion 12. In addition to reducing the length of the seat back moment arm, the high pivot also enables the seat back to be folded forward to a horizontal position as shown by the seat back frame 30 in the phantom line position. This forward horizontal position aids in removing the seat assembly from a motor vehicle and reduces the space needed to store the seat outside of the vehicle.

The seat assembly 10 includes along each lateral side a fixed rail 32 that is coupled to a vehicle floor pan by a front hook 34 engaging floor pan pin 36 and a rear latch hook 38 coupled to a rear floor pan pin 40. An upper rail 42 on each side of the seat is interconnected with the fixed rail 32 for sliding motion to adjust the fore and aft position of the seat assembly.

A pair of stanchions, outer stanchion 44 and inner stanchion 46 are coupled to each upper rail 42 by a plurality of fasteners 47. The stanchions extend upwardly to form the seat back pivot 28 to support the seat back frame 30 thereon.

A recliner arm is also mounted about pivot 28 and extends downwardly to a lower end 50 which is secured by a drive nut 52 to hold the recliner arm in place. The seat back frame 30 is secured to the recliner arm 48 by a link 54 rotatably mounted to the frame 30 at pivot 56. Link 54 carries a pin 58 that is seated into a recess 60 in the recliner arm 48. Lever 62 can be manually rotated to withdraw the pin 58 from the recess 60 to enable forward rotation of the seat back to the horizontal position. Once in the horizontal position, the pin seats into a recess 64 in the outer and inner stanchions 44 and 46 to hold the seat back in the horizontal position.

The recliner mechanism is operated by an electric motor and transmission assembly 66 which is mounted to the upper rail through a motor mount 68. The motor transmission assembly 66 is used to rotate lead screw 70 to cause the drive nut 52 to move longitudinally along the lead screw. Pin 72 extends laterally from the drive nut through the slot 74 in the lower end 50 of recliner arm 48.

As the drive nut 52 moves forward along lead screw 70, the recliner arm 48 is rotated clockwise about pivot 28, moving the recess 60 in a clockwise direction as well, causing the seat back frame 30 to likewise rotate about the pivot 28. FIG. 3 illustrates the seat assembly with the seat back frame 30 in a reclined position. Notice in FIG. 3 that as the drive nut 52 has moved forward, pin 72 has moved downward within the slot 74. This is due to the arcuate path of the recliner arm in response to linear motion of the drive nut.

The seat cushion 12 is supported by a platform assembly (not shown) which is in turn supported by a pair of lift arms 76 with one arm along each side of the seat assembly. The lift arms 76 are connected to the upper rails 42 through lift brackets 78 at the forward end of the seat cushion.

A lift pin 80 acting as a cam follower is coupled to the recliner arm 48 and engages the lower rear cam surface 82 of the lift arm 76 and seat cushion. Lift pin 80 provides the rear support for the lift arm 76. As the recliner arm 48 is moved forwardly in an arc about pivot 28, the lift pin 80 also travels in an arc about the pivot 28 urging the lift arm 76 to rotate upwardly about the front pivot 84. In so doing, the rear end of seat cushion 12 is raised upwardly in response to the rearward reclining of the seat back 14. As a result of raising the rear end of the seat cushion, the hip point of a seat occupant is raised.

The extent by which the rear end of lift arm 76 is raised is dependent upon the arcuate path of lift pin 80 and the shape of the lower rear surface 82 of the lift arm 76. In the embodiment shown, the surface 82 is a convex surface. By shaping the surface 82 differently, the ratio of seat cushion lift relative to seat back recline can be changed.

The rear end of lift arm 76 includes a downward extending stop 86 that prevents separation of the lift pin 80 from lift arm 76.

Figure 5:
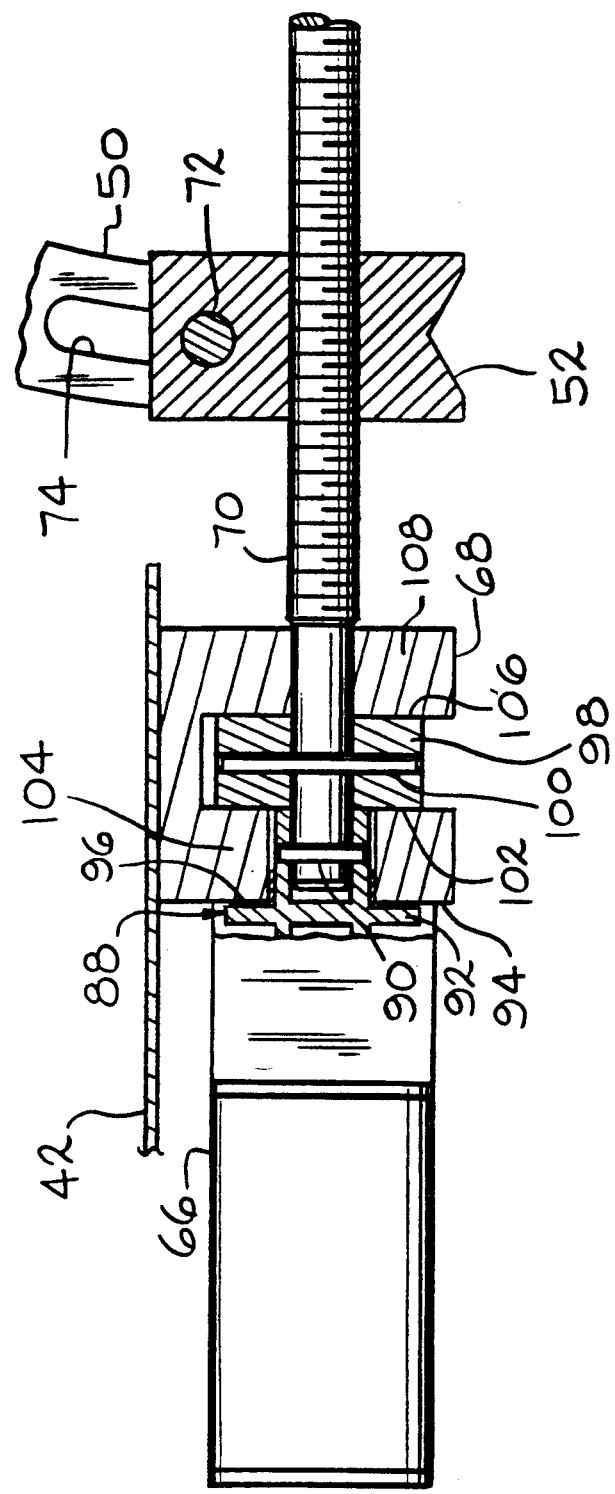
FIG. 5 is a sectional view as seen from substantially line 5—5 in FIG. 3 illustrating the motor mount for the recliner mechanism.

With reference to FIG. 5, the motor and transmission assembly 66 is mounted to a U-shaped mounting bracket 68 secured to the upper rail 32. A coupling 88 connects the output shaft (not shown) of the motor transmission assembly to the end of lead screw 70 by a pin 90. The coupling 88 includes a radially extending outward flange 92 which bears against the side surface 94 of the motor mount. A bushing 96 is placed between the coupling 88 and the motor mount. The radial flange 92 bears against the motor mount to resist the axial loads applied to the lead screw from the worm gear transmission.

The U-shaped mounting bracket 68 contains a thrust ring 98 between its two legs that is also pinned to lead screw 70 by pin 100. In the event of a vehicle collision, the rotational load applied to the seat back must be resisted by the reclining mechanism through the recliner arm 48. The thrust ring 98 will resist the large axial loads placed on the lead screw 70 and transfer those loads directly to the motor mount and upper rail 42 rather than relying on the internal components of the transmission motor assembly 66 to transfer these high loads to the motor mount.

The seat assembly of the present invention thus raises the rear of the seat cushion in response to rearward reclining of the seat back. This raises the occupant's hip point simultaneously with reclining, producing a more comfortable seat assembly. The above is accomplished by a cam follower pin on the recliner mechanism which engages a cam surface on the seat cushion to support the seat cushion rear end.

It is to be understood that the invention is not limited to the exact construction illustrated and described above, but that various changes and modifications may be made without departing from the spirit and scope of the invention as defined in the following claims.

I claim:

1. A seat assembly comprising:

a support frame;

a seat part having a forward end and a rearward end, said seat part being pivotally mounted to said frame for rotation about a first transverse axis fixed in position relative to said seat part forwardly of said rearward end;

a seat back extending upwardly at the rearward end of said seat part and pivotally mounted to said frame for rotation about a second transverse axis for movement between an upright position and a rearwardly rotated reclined position;

means operatively associated with said seat back and said seat part for rotating said set back between said upright position and said reclined position and for rotating said seat part about said first axis to raise the rearward end of said seat part when said seat back is rotated rearwardly;

said means for rotating including a recliner arm mounted to said support frame for rotation about said second axis and coupled to said seat back for rotation therewith, said recliner arm extending generally downwardly from second axis when said seat back is in said upright position;

drive means mounted to said support frame and coupled to said recliner arm for selectively rotating said recliner arm and for retaining said recliner arm in a selected rotational position whereby said seat back is rotated and retained in said reclined position;

a cam pin extending from said recliner arm with the rearward end of said seat part rearward of said first axis resting upon said cam pin and being supported thereon whereby as said seat back is rotated rearwardly to said reclined position, said cam pin moves in an arcuate path about said second axis from a rear-lower position corresponding to said seat back upright position to forward-raised position corresponding to said seat back reclined position and raises the rearward end of said seat part supported thereon; and said seat part including a convex cam surface across which said cam pin moves as said recliner arm is rotated, said convex cam surface having a rearward end.

2. The seat assembly of claim 1 further comprising stop means at the rearward end of said cam surface to prevent rearward travel of said cam pin beyond said seat part and wherein said convex cam surface extends downwardly and forwardly from said stop means.

3. The seat assembly of claim 1 wherein said drive means comprises:

a motor/transmission assembly coupled to said support frame via mount means;

an elongated lead screw driven by said motor/transmission assembly for rotation about an axis of said screw;

a drive nut threadably carried by said lead screw for linear motion along said screw axis in response to rotation of said screw; and means for coupling said drive nut to said recliner arm through a slot in said recliner arm whereby said recliner arm is rotated about said second axis as said drive nut is moved linearly.

4. The seat assembly of claim 3 further comprising a thrust ring mounted to said lead screw having a surface engageable with said mount means to resist axial deflection of said lead screw in response to axial loads applied to said lead screw by said recliner arm.

* * * * *